W. J. Millar.
Car-Coupling.

Nº 72664. Patented Dec. 24, 1867.

Witnesses.
W. D. Lewis
Allan L. Bakewell.

Inventor.
William J. Millar,
by Bakewell & Christy,
his Attorney.

United States Patent Office.

WILLIAM J. MILLAR, OF McKEESPORT, PENNSYLVANIA.

Letters Patent No. 72,664, dated December 24, 1867.

IMPROVED CAR-COUPLING.

*The Schedule referred to in these Letters Patent and making part of the same.*

TO ALL WHOM IT MAY CONCERN:

Be it known that I, WILLIAM J. MILLAR, of McKeesport, in the county of Allegheny, and State of Pennsylvania, have invented new and useful Improvement in Car-Couplings; and I do hereby declare the following to be a full, clear, and exact description thereof, reference being had to the accompanying drawings, making a part of this specification, in which—

Figure 1:
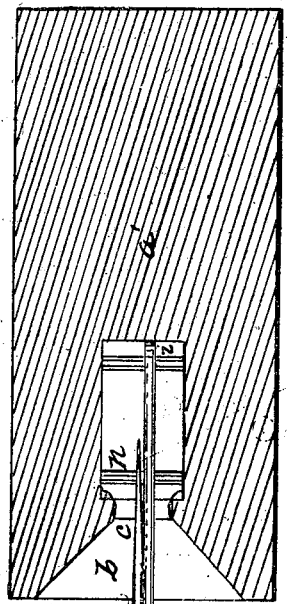
Figure 2:
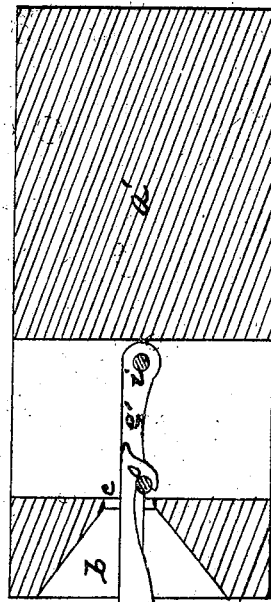

Figure 1 is a horizontal section passing through my improvement, showing the devices I employ; and Figure 2 is a vertical section showing the same devices.

Like letters of reference indicate like parts.

The desirableness of a self-attaching, and, in certain cases of accident, of a self-detaching apparatus for connecting railway-cars, whereby the danger of loss of life, and injury to the persons of both travellers and employés may be lessened, is perfectly manifest.

The nature of my invention consists in the construction of a car-coupling which shall be self-acting in coupling cars together, and which, when for any reason a car leaves or is thrown from the taack, will automatically uncouple, so as not to involve other cars, with which it may be connected, in the same disaster.

To enable others skilled in the art to make and use my invention, I will proceed to describe its construction and mode of operation.

$a$ and $a'$ represent two draw-heads, similar to each other, of any desirable form, except as hereinafter to be described, and which are attached to either freight or passenger-cars in any ordinary way. Each such draw-head $a$ or $a'$ has a hopper-shaped bull-nose, $b$, large at the outer end, and terminating in a throat, $c$, small but of sufficient size to admit readily the connecting or coupling-bars $e\ e'$, and allow of their free and easy play in both a vertical and lateral direction, so far as is required by the corresponding movements of the cars. The bars $e\ e'$ for coupling are substantially of the shape shown in the drawings. They are secured each to its draw-head $a\ a'$ by bolts $i\ i$, removable or otherwise at pleasure, passing through one end of each, while the other ends, $o\ o$, of hook-shape, slip over or hook on to bolts or pins $n\ n$. The coupling-bars $e\ e'$ are usually made flat, with arrow-shaped heads $o\ o$, as shown in fig. 2, so that they shall not impinge against each other, end to end, when the cars come together. At the same time they are guided to their places by the sloping sides of the bull-nose $b$, so made that the coupling-bars $e\ e'$ may enter and couple at any angle the cars may assume when run together. Thus entering, the arrow-headed hooks $o\ o$ drop over the pins $n\ n$, and the coupling is completed. The upper edges of the coupling-bars $e\ e'$ are bevelled, particularly near the heads $o\ o$, in order that one may not ride the other when in the act of coupling. Both the coupling-bars $e\ e'$ have a free lateral motion on their respective bolts $i\ i$, so as to permit either to slide freely, right or left, as the other, when entering, may chance to strike it.

As above stated, the throat $c$ in each draw-head $a\ a'$ is sufficiently deep to allow free vertical play to the coupling-bars $e\ e'$, for all ordinary motions of the cars; but if a car leaves or is thrown from the track, or falls through a bridge or trestle-work, or meets with other similar accident, the change in the position of such car, relative to the cars to which it is coupled, will cause all to act on their coupling-bars $e\ e'$ as if the latter were levers, so as to cause the hooks $o\ o$ to be unhooked from the pins $n\ n$. The weight of each car acts as a power at its bolt $i$, on its bar $e$ or $e'$, and the pins $n$ or throat $c$, being fulcra, causing them to unhook. Thus the cars are automatically uncoupled, the falling car entirely disengaged, and the other car or cars left on the track. The same result is secured when one of the cars turns over sideways down an embankment. Each of the coupling-bars $e\ e'$ is then unhooked, by being turned so that the vertical plane of its hook, $o$, shall be brought parallel to a plane passing longitudinally through the axis of the pin $n$. In such case the hooks $o\ o$ will obviously be detached. The inner edges of each throat, $c$, should be rounded or bevelled that the hooks $o\ o$ may not catch on them.

My invention is of advantage, and is an additional and important element of safety, not only to the cars that remain on the track, as above set forth, but also to such car or cars as leave the track, since many of the disastrous effects or results of railway-accidents are caused by the dragging of the injured or displaced car. Even by the breaking of a wheel or an axle, a car will be dropped sufficiently low to uncouple in the manner above stated. Then, being detached from the locomotive, it must necessarily stop till the break or other injury is repaired. Thus the danger of loss of life and injury of person to all the passengers and employés on a railway train, in case of accident, is greatly lessened.

As a further advantage, though of less importance as compared with loss of life or bodily harm, I claim that the cars themselves will be much less liable to injury from accident when thus coupled, so that a great saving in cost of repairs will be effected by the use of my improvement. As the bars $e\ e'$ are counterparts of each other, as well as the draw-heads $a\ a'$, the cars may be reversed or turned around on the track. In every such case the coupling, as described, will be ready for use. It is simple, easily constructed and operated, effective, automatic in its action in coupling, and, in case of accident, equally so in uncoupling. The use of it obviates all necessity of endangering life in making up a train.

The bolts $i\ i$ and pins $n\ n$ may occupy any relative position with reference to each other in their respective draw-heads, provided only they be so placed as to perform the functions above named. The hooks described should not project so far under their pins $n\ n$, when in operation, but that they may readily be disengaged in the manner above set forth.

To uncouple the cars, I simply raise the coupling-bars $e\ e'$, either by hand or by an apparatus especially designed for that purpose. The hooks $o\ o$ being thus loosened, the cars may be drawn apart.

The bull-nose $b$, instead of having a hopper-shape, may be of the form of a hollow cone or frustum of a cone, the smaller end terminating in the throat $c$.

What I claim as my invention, and desire to secure by Letters Patent, is—

Two coupling-bars, attached by bolts, one to each of two opposite draw-heads, each coupling-bar having an arrow-shaped head and hook, in combination with the hopper-shaped or conical bull-nose $b$, and pins or bolts over which the hooks slide and couple, for the purpose of forming a self-connecting and disconnecting car-coupling, substantially in the manner hereinbefore set forth.

In testimony whereof, I, the said WILLIAM J. MILLAR, have hereunto set my hand, in presence of—

WILLIAM J. MILLAR.

Witnesses:
    A. S. NICHOLSON,
    GEO. H. CHRISTY.